(12) United States Patent
Ichiryu

(10) Patent No.: US 10,293,641 B2
(45) Date of Patent: May 21, 2019

(54) MOTORCYCLE TIRE FOR UNEVEN GROUND TRAVEL

(71) Applicant: SUMITOMO RUBBER INDUSTRIES, LTD., Kobe-shi, Hyogo (JP)

(72) Inventor: Yutaka Ichiryu, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 278 days.

(21) Appl. No.: 15/027,461

(22) PCT Filed: Oct. 2, 2014

(86) PCT No.: PCT/JP2014/076445
§ 371 (c)(1),
(2) Date: Apr. 6, 2016

(87) PCT Pub. No.: WO2015/064297
PCT Pub. Date: May 7, 2015

(65) Prior Publication Data
US 2016/0250896 A1    Sep. 1, 2016

(30) Foreign Application Priority Data

Oct. 28, 2013  (JP) ................................. 2013-223639

(51) Int. Cl.
*B60C 11/11* (2006.01)
*B60C 11/03* (2006.01)
*B60C 11/13* (2006.01)

(52) U.S. Cl.
CPC ...... *B60C 11/0332* (2013.01); *B60C 11/0304* (2013.01); *B60C 11/0311* (2013.01);
(Continued)

(58) Field of Classification Search
CPC ............ B60C 2200/10; B60C 2200/12; B60C 2200/14; B60C 11/0309; B60C 11/0311
See application file for complete search history.

(56) References Cited

U.S. PATENT DOCUMENTS

D648,260 S * 11/2011 Ishida .......................... D12/536
2009/0165908 A1 * 7/2009 Takahashi ........... B60C 11/0306
152/209.18
(Continued)

FOREIGN PATENT DOCUMENTS

DE    3005651 A1 *  8/1981  .............. B60C 11/11
EP    0368582 B1 *  4/1993  .............. B60C 11/11
(Continued)

OTHER PUBLICATIONS

Machine Translation: DE-3005651-A1; Pieper Henner; (Year: 2018).*
(Continued)

*Primary Examiner* — Kendra Ly
(74) *Attorney, Agent, or Firm* — Birch, Stewart, Kolasch & Birch, LLP

(57) ABSTRACT

The purpose of the present invention is to provide a motorcycle tire for uneven ground travel for which the sticking of dirt to block grooves can be effectively prevented. Provided is a motorcycle tire for uneven ground travel in which a tread portion has a block pattern in which a plurality of blocks are provided. The blocks include, at the tread surface, at least one grooved block which has a block groove which is substantially C-shaped in plan view. The block groove has a pair of first groove portions that mutually extend in the same direction from the edge of the tread surface, and a second groove portion that links the first groove portions. The groove width W2 of the second groove portion is larger than the groove width W1 of the first groove portions, or the groove depth d2 of the second groove portion is larger than the groove depth d1 of the first groove portions.

9 Claims, 6 Drawing Sheets

(52) U.S. Cl.
CPC .......... *B60C 11/11* (2013.01); *B60C 11/1376* (2013.01); *B60C 2011/0334* (2013.01); *B60C 2200/10* (2013.01); *B60C 2200/14* (2013.01)

(56) References Cited

U.S. PATENT DOCUMENTS

| | | | | |
|---|---|---|---|---|
| 2012/0024440 | A1* | 2/2012 | Ishida | B60C 11/11 |
| | | | | 152/209.1 |
| 2012/0305154 | A1* | 12/2012 | Hikita | B60C 11/11 |
| | | | | 152/209.11 |

FOREIGN PATENT DOCUMENTS

| | | | | | |
|---|---|---|---|---|---|
| EP | | 2374636 | A1 | 10/2011 | |
| EP | | 2412547 | A1 | 2/2012 | |
| JP | | 63-291706 | A | 11/1988 | |
| JP | | 2000-255220 | A | 9/2000 | |
| JP | | 2000238514 | A * | 9/2000 | ......... B60C 11/1281 |
| JP | | 2012-030615 | A | 2/2012 | |

OTHER PUBLICATIONS

Machine Translation: JP-2000238514-A; Takahashi, Fumio; (Year: 2018).*
International Search Report issued in PCT/JP2014/076445 dated Dec. 22, 2014.
Written Opinion of the International Searching Authority issued in PCT/JP2014/076445 dated Dec. 22, 2014.
Extended European Search Report, dated Jun. 23, 2017, for European Application No. 14858851.0.

\* cited by examiner

MOTORCYCLE TIRE FOR UNEVEN GROUND TRAVEL

TECHNICAL FIELD

The present invention relates to a motorcycle tire for rough terrain for which can effectively suppress mud clogging of a block groove provided in a block.

BACKGROUND ART

For example, a motorcycle tire for rough terrain used in motocross or the like comprises a plurality of blocks in a tread portion. Such a tire, at the time of traveling on an uneven ground, the blocks bite into a road surface thereby exhibiting excellent grip performance.

To obtain greater grip performance, for example, the following Patent Document 1 proposes a motorcycle tire for rough terrain to be provided in the block with a substantially U-shaped block groove in planar view. Such a block groove exerts an edge effect in particularly dry irregular terrain, and improves the grip performance.

PRIOR ART DOCUMENTS

Patent Literature

Patent Document 1: Japanese Unexamined Patent Publication No. 2012-30615

SUMMARY OF THE INVENTION

Problems that the Invention is to Solve

However, a motorcycle tire for rough terrain of the Patent Document 1 has a problem that continuous traveling likely causes the mud clogging of the block groove thereby decreasing the grip performance and the like.

The present invention has been devised in view of the circumstances described above. It is a main object to provide a motorcycle tire for rough terrain capable of effectively suppressing the mud clogging of the block groove and stably exhibiting high grip performance based on defining a shape of the block groove provided in the block.

Means for Solving the Problems

According to the first aspect of the present invention, a motorcycle tire for rough terrain comprises: a tread portion comprising a block pattern having a plurality of blocks; the blocks comprising at least one grooved block whose ground contact surface is provided with a block groove; the block groove comprising a pair of first groove portions mutually extending in a same direction from an edge of the ground contact surface, and a second groove portion connecting the first groove portions. The second groove portion having a groove width greater than groove widths of the first groove portions.

According to the second aspect of the present invention, a tread portion comprises a block pattern having a plurality of blocks; the blocks comprising at least one grooved block whose ground contact surface is provided with a block groove; the block groove comprising a pair of the first groove portions mutually extending in a same direction from an edge of the ground contact surface, and the second groove portion connecting the first groove portions; and the second groove portion having a groove depth greater than groove depths of the first groove portions.

In another aspect of the present invention, the grooved block comprises an outer portion in a substantially U-shape in planar view disposed outward of the block groove, and an inner portion surrounded by the block groove, and the ground contact surface of the outer portion and the ground contact surface of the inner portion may be smoothly continuous with each other through the block groove.

In another aspect of the present invention, the grooved block comprises the outer portion in a substantially U-shape in planar view disposed outward of the block groove, and the inner portion surrounded by the block groove, and the area S1 of the ground contact surface of the inner portion may be from 0.15 to 0.45 times the area Sb of a virtual ground contact surface obtained by filling all grooves formed on the grooved block.

In another aspect of the present invention, a pair of the first groove portions may extend in an axial direction of the tire.

In another aspect of the present invention, the tread portion comprises, in a meridian section including the tire rotational axis, a crown region occupying ⅓ of a tread developed width centered at a tire equator, a pair of shoulder regions each occupying ⅙ of the tread developed width, and middle regions each disposed between the crown region and the shoulder region, the grooved block comprises a grooved crown block disposed in the crown region, and a grooved middle block disposed in the middle region, and the first groove portions of each of the grooved crown block and the grooved middle block may be communicated with an edge of the ground contact surface on a side of a tread edge.

In another aspect of the present invention, the grooved block comprises a first grooved shoulder block disposed in axially outermost in the shoulder region, and the first groove portions of the first grooved shoulder block may be communicated with an edge of the ground contact surface on the side of the tire equator.

Effect of the Invention

Motorcycle tire for rough terrain according to the present invention, the tread portion has a block pattern in which pluralities of blocks are provided. The blocks comprising at least one grooved block whose ground contact surface is provided with a block groove.

The block groove comprises a pair of first groove portions mutually extending in a same direction from an edge of the ground contact surface, and a second groove portion connecting the first groove portions. Such a block groove exerts edge effects in multiple directions, and particularly an excellent grip performance in a dry and rough terrain is exhibited. Moreover, the second groove portion has a groove width grater than groove widths of the first groove portions or has a groove depth greater than groove depths of the first groove portions. Thus, the inner portion of the grooved blocks surrounded by the block groove is more likely to be deflected along the length direction of the first groove portion. Owing to such a deflection of the inner portion, mud clogged into first groove portion and the second groove portion can be effectively discharged. Thus, the mud clogging of the block groove is effectively suppressed, and the stable and high grip performance can be exhibited even when a road surface condition is changed.

DESCRIPTION OF THE INVENTION

Hereinafter, an embodiment of the present invention will be described with reference to the accompanying drawings.

Figure 1:
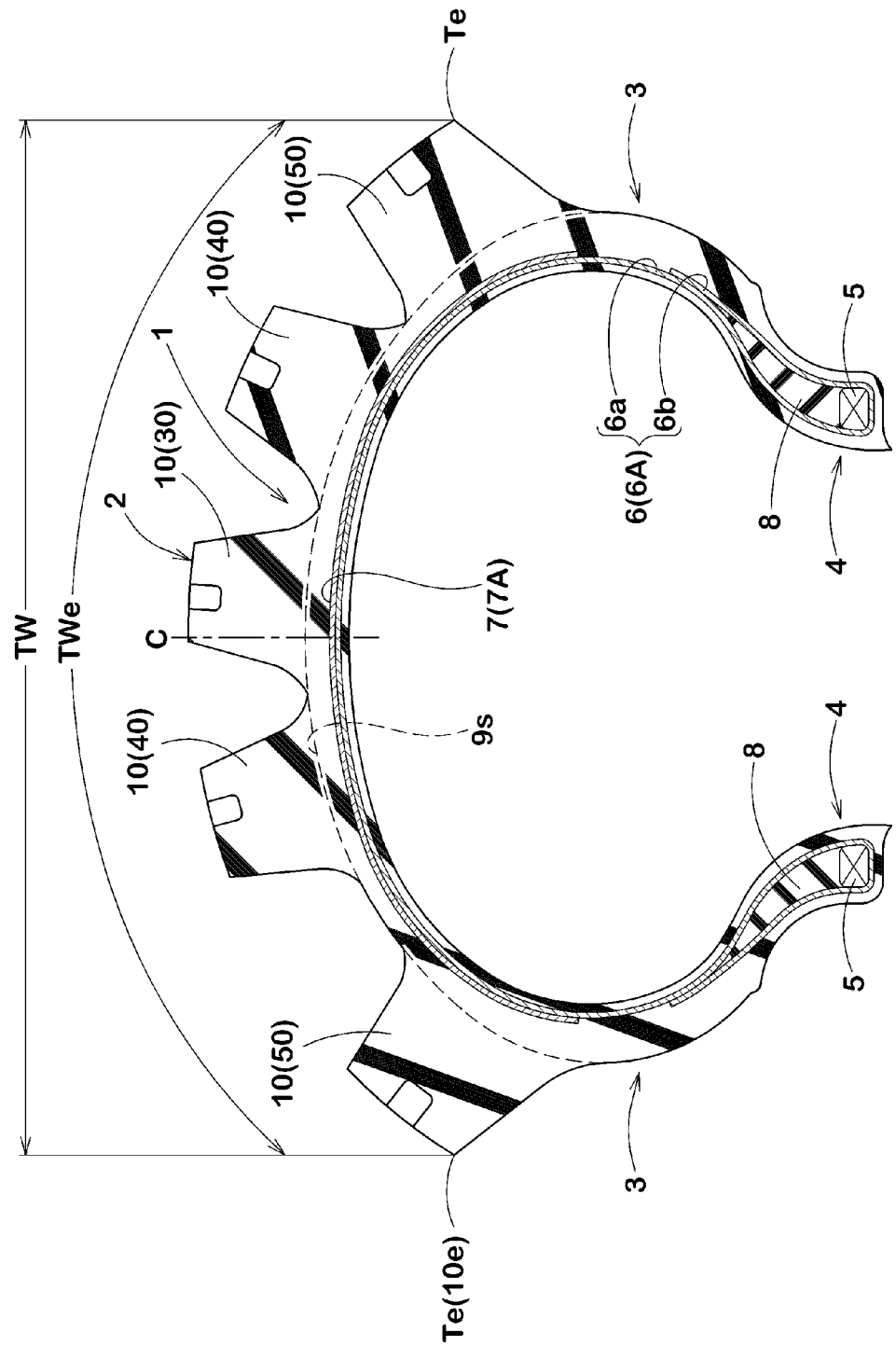
FIG. 1 is a cross-sectional view showing a motorcycle tire for rough terrain according to the present embodiment.
Figure 2:
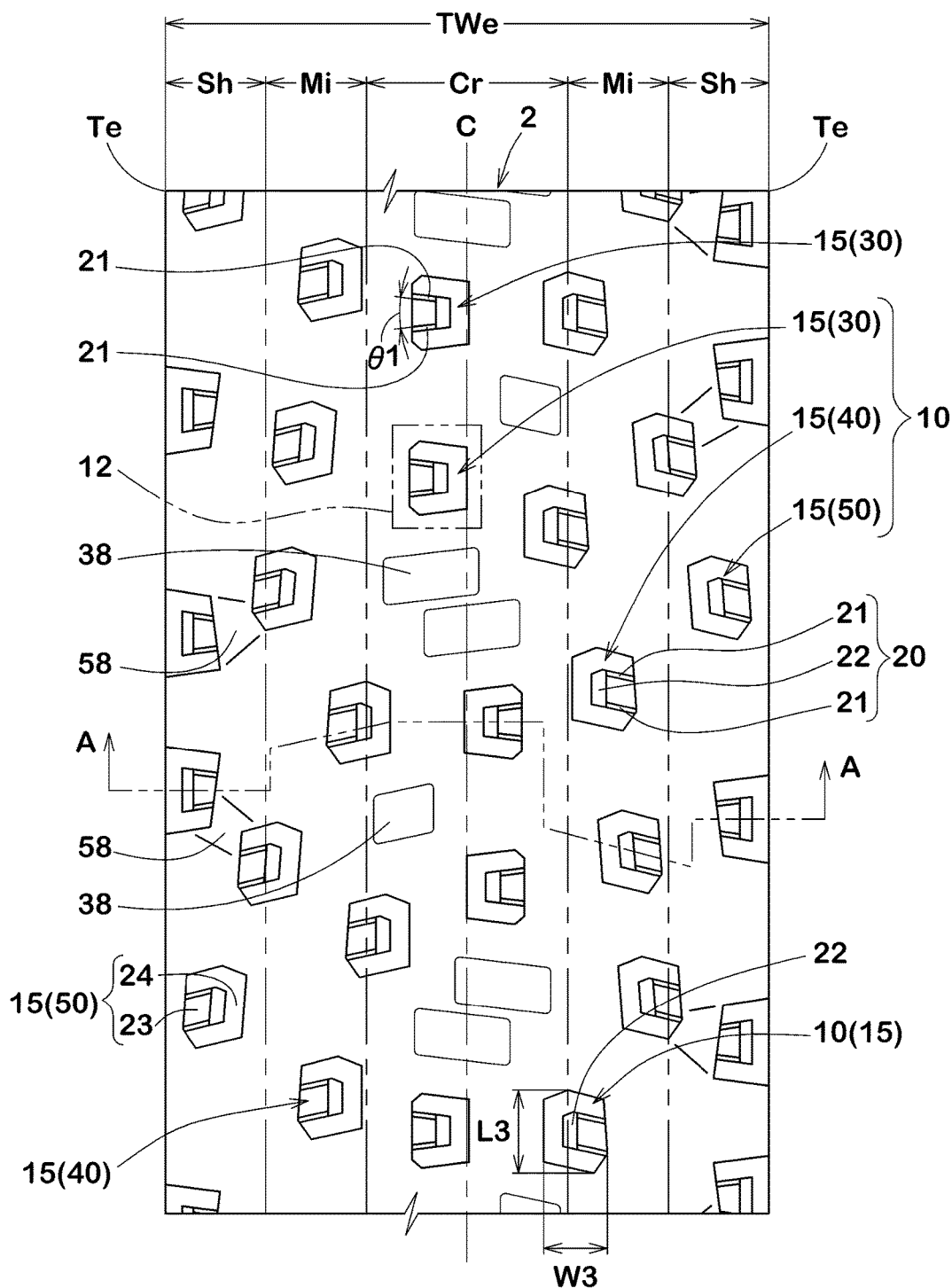
FIG. 2 is a development view of a tread portion of FIG. 1.

In FIG. 1, as a motorcycle tire for rough terrain (hereinafter, simply will be referred to as "tire") 1 of the present embodiment, a tire for motocross race is illustrated. FIG. 1 is a cross-sectional view of a standard state of the tire 1. FIG. 2 is a development view of a tread portion 2 of the tire 1. The cross-sectional view of FIG. 2 along the line A-A is shown in FIG. 1.

The above-mentioned "standard state" means a sate of a tire filled with standard internal pressure with no-load and assembled on a standard rim (not shown). Hereinafter, if not specifically mentioned, dimensions and the like of each part of the tire are values measured in the standard state.

The above-mentioned "standard rim" means a rim officially approved for each tire by a standard including one on which the tire is based. The standard rim is a standard rim in the case of JATMA, a "Design Rim" in the case of TRA, and a "Measuring Rim" in the case of ETRTO.

The "standard internal pressure" means an air pressure officially approved for each tire by the standard. The "standard internal pressure" is a maximum air pressure in JATMA, a maximum value described in a table "TIRE LOAD LIMITS AT VARIOUS COLD INFLATION PRESSURES" in the case of TRA, and "INFLATION PRESSURE" in the case of ETRTO.

As shown in FIG. 1, the tire 1 of the present embodiment comprises a carcass 6 and a tread reinforcing layer 7.

The carcass 6 extends from a tread portion 2 through a sidewall portion 3 to a bead core 5 of a bead portion 4. The carcass 6 is, for example, formed of one carcass ply 6A. The carcass ply 6A includes a main portion 6a and a turnup portion 6b. The main portion 6a extends from the tread portion 2 through the sidewall portion 3 to the bead cores 5 embedded in the bead portion 4. The turnup portion 6b is continues into the main portion 6a and folded back around the bead core 5.

Between the main portion 6a and the turnup portion 6b, a bead apex rubber 8 extending in a tapered shape from the bead core 5 outward in the radial direction of the tire is provided. The bead apex rubber 8 is, for example, formed of hard rubber. Consequently, the bead portion 4 can be reinforced effectively.

The tread reinforcing layer 7 is, for example, disposed radially outwardly of the carcass 6 and inwardly of the tread portion 2. The tread reinforcing layer 7 is formed of, for example, one reinforcing ply 7A. In the reinforcing ply 7A, for example, reinforcing cords are arranged to be inclined with respect to the tire equator C. For the reinforcing cords, for example, aramid or rayon and the like are preferably employed.

The outer surface of the tread portion 2 is curved convexly and outwardly in the radial direction of the tire. A tread width TW, which is an axial distance between tread edges Te and Te of the tread portion 2, forms a maximum width of the tire.

The tread edge Te means an axially outer edge 10e of the block 10 located on the axially outermost side among the blocks 10 disposed in the tread portion 2.

As shown in FIG. 2, the tread portion 2 includes a crown region Cr, shoulder regions Sh, and middle regions Mi. The crown region Cr is a region occupying ⅓ of a tread developed width TWe centered at a tire equator C. Each of the shoulder regions Sh is a region occupying ⅙ of the tread developed width TWe from the tread edge Te to the tire equator C. Each of the middle regions Mi is a region each disposed between the crown region Cr and the shoulder region Sh.

The tread developed width TWe means a distance in the tread width direction, between the tread edges Te and Te along an outer surface of the tread portion 2.

As shown in FIG. 2, in the crown region Cr, the middle region Mi and the shoulder region Sh of the tread portion 2, a plurality of blocks 10 are provided, respectively. In each of the blocks 10 of the present embodiment, for example, an axial width W3 of the ground contact surface is from 5% to 15% of the tread developed width TWe. A circumferential length L3 of the block 10 is, for example, from 1.25 to 1.50 times the width W3 of the block 10.

The block 10 includes at least one grooved block 15 whose ground contact surface is provided with the block groove 20.

The grooved blocks 15 preferably disposed in plural in each of the crown region Cr, the middle region Mi and the shoulder region Sh. In the present embodiment, all the blocks 10 disposed in the tread portion 2 are the grooved blocks 15. However, the present invention is not limited to such a mode.

Figure 3:
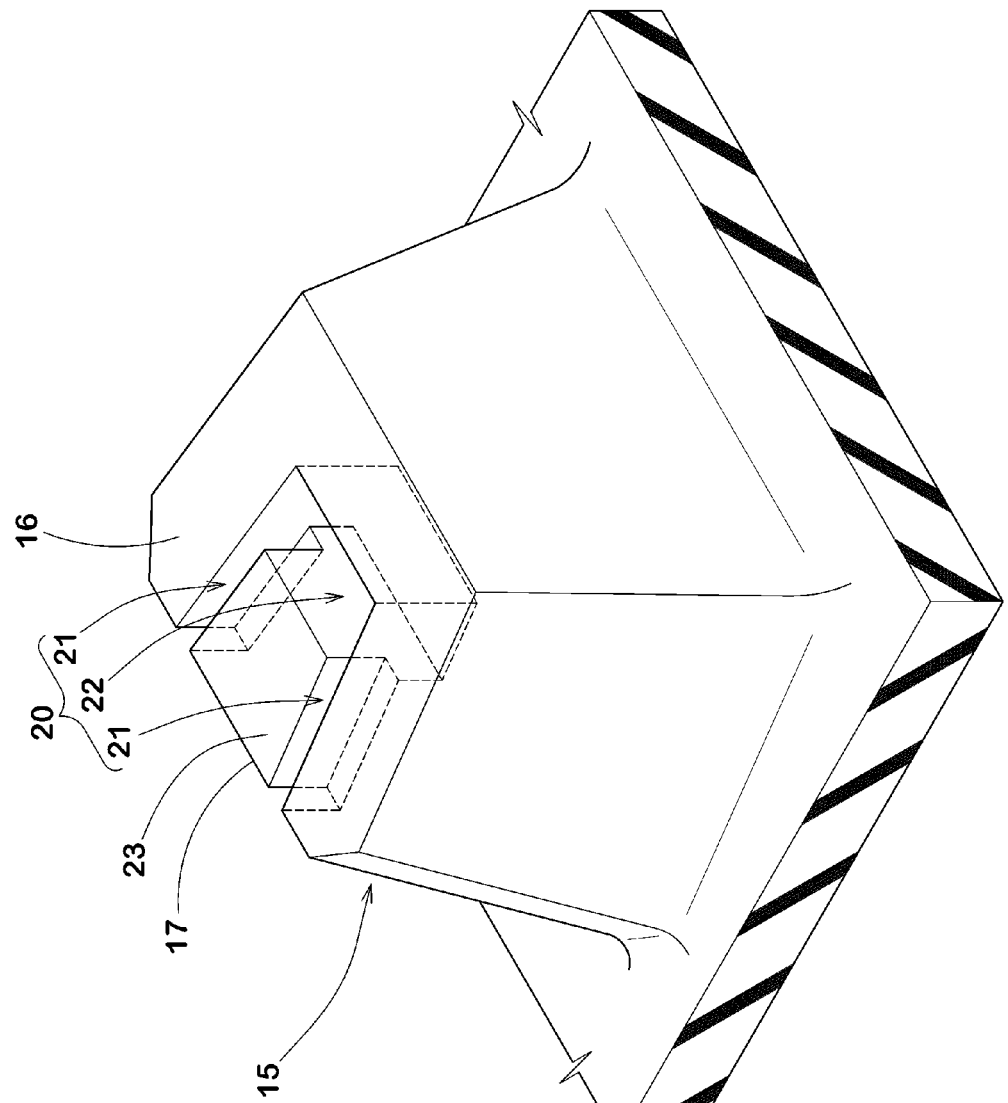
FIG. 3 is an enlarged perspective view of a grooved block.

FIG. 3 is an enlarged perspective view of the grooved block 15. FIG. 3 is an enlarged perspective view of a region 12 surrounded by a two-dot chain line in FIG. 2. As shown in FIG. 3, the block groove 20 provided in the grooved block 15 includes a pair of the first groove portions 21 and 21 and the second groove portion 22.

The first groove portion 21, for example, has substantially constant groove width and groove depth and extends in a straight fashion. The pair of the first groove portions 21 and 21 mutually extend in a same direction from an edge 17 of the ground contact surface 16 of the grooved block 15. The expression "the pair of the first groove portions 21 and 21 mutually extend in a same direction" means that the pair of the first groove portions 21 and 21 extend in parallel with each other and also include a case that an angle θ1 (shown in FIG. 2) of the pair of the first groove portions 21 and 21 is not more than 45 degrees.

As shown in FIG. 2, the angle θ1 between the pair of first groove portions 21 and 21 is preferably not more than 35 degrees, more preferably not more than 25 degrees. The first groove portion 21 can make the rigidity distribution of the block uniform and can effectively suppress the block chipping.

As shown in FIG. 3, the second groove portion 22 connects between the first groove portions 21 and 21. The block groove 20 including the first groove portion 21 and the second groove portion 22 exerts the edge effects in multiple directions, and excellent grip performance in particularly dry irregular terrain is exhibited.

Figure 4A:
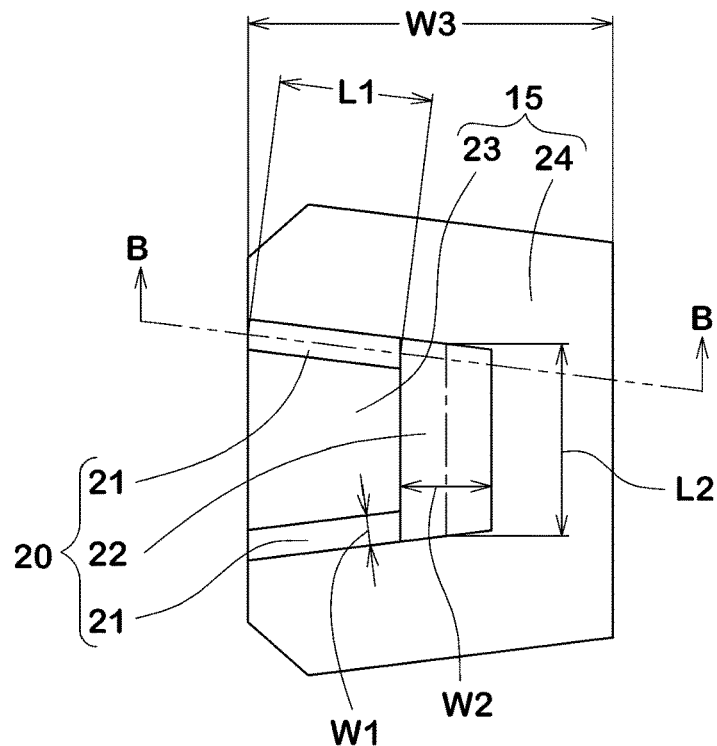
FIG. 4(a) is an enlarged plan view of the grooved block.
Figure 4B:
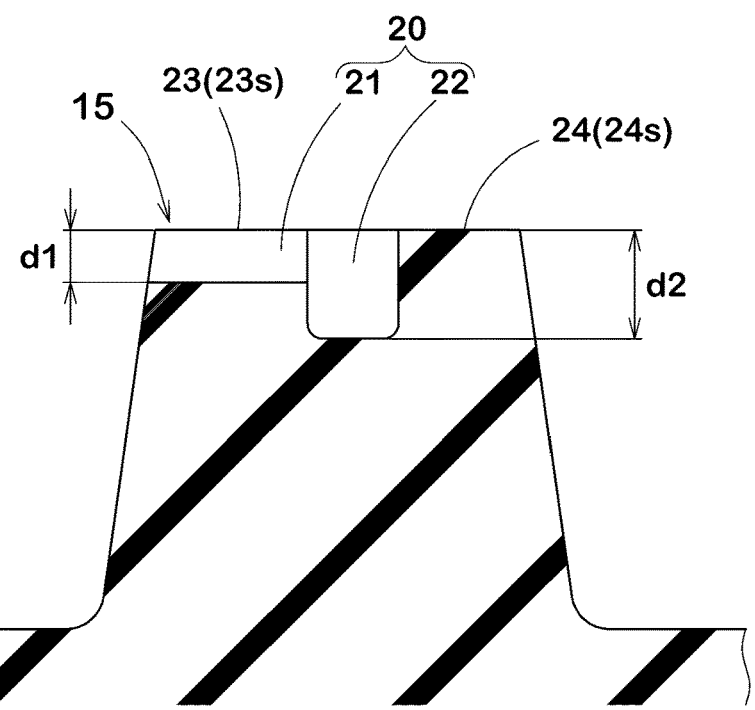
FIG. 4(b) is a cross-sectional view of FIG. 4(a) along the line B-B.

FIG. 4(a) is an enlarged view of the ground contact surface of a grooved block 15. FIG. 4(b) is a cross-sectional view of FIG. 4(a) along the line B-B. As shown in FIGS.

4(a) and (b), the second groove portion 22 has the groove width W2 grater than the groove width W1 of the first groove portions 21 or has the groove depth d2 is greater than the groove depth d1 of the first groove portions 21.

Thus, the inner portion 23 of the grooved block 15 surrounded by the block groove 20 is easily bent along the longitudinal direction of the first groove portion 21. Owing to the deflection of such inner portion 23, the mud clogged into first groove portion 21 and the second groove portion 22 can be effectively discharged. Thus, the mud clogging of the block grooves 20 can be effectively suppressed. Therefore, even if road conditions are changed, the stable and high grip performance is exhibited (hereinafter sometimes referred to as "road surface corresponding performance").

As shown in FIG. 4(a), in order to exhibit the effect described above, a length L1 of the first groove portion 21 (which means a length of a groove center line) is preferably not less than 0.3 times, more preferably not less than 0.35 times, and preferably not more than 0.5 times, more preferably 0.45 times the tire axial width W3 of the grooved blocks 15. This first groove portion 21 exhibits an excellent edge effect while maintaining the rigidity of the block.

From the same viewpoint, the groove width W1 of the first groove portion 21 is preferably not less than 0.8 mm, more preferably not less than 1.2 mm, and preferably not more than 2.0 mm, more preferably not more than 1.6 mm. The groove depth d1 (shown in FIG. 4(b)) of the first groove portion 21 is preferably not less than 0.5 mm, more preferably not less than 1.0 mm, and preferably not more than 2.0 mm, more preferably not more than 1.5 mm.

The longitudinal direction of each of the first groove portions 21 is not particularly limited. The first groove portion 21 in the present embodiment extends, for example, at an angle of not more than 30 degrees with respect to the tire axial direction. This first groove portion 21 exhibits the excellent edge effect with respect to the tire circumferential direction. Therefore, it is exhibited excellent traction performance.

As shown in FIG. 4(a), the length L2 (which means a length of the groove center line) of the second groove portion 22 is preferably not less than 0.45 times, more preferably not less than 0.50 times, and preferably not more than 0.65 times, more preferably not more than 0.60 times the width W3 of the grooved block 15. The second groove portion 22 exhibits the excellent steering stability while maintaining the rigidity of the block, moreover, effectively suppressing clogging of mud into block the groove.

The groove width W2 is the second groove 22 is preferably not less than 1.5 mm, more preferably not less than 3.0 mm, and preferably not more than 5.0 mm, more preferably not more than 3.5 mm. If the groove width W2 is less than 1.5 mm, the inner part 23 is difficultly deflected, and there is a possibility that the road surface corresponding performance is reduced. Conversely, if the groove width W2 is more than 5.0 mm, the rigidity of the block decreases, and there is a possibility that a feeling of grounding and grip feeling may be lowered.

A groove depth d2 (shown in FIG. 4(b)) of the second groove portion 22 is preferably not less than 1.5 mm, more preferably not less than 2.5 mm, and preferably not more than 4.0 mm, more preferably not more than 3.0 mm. The second groove portion 22 exhibits the excellent road corresponding performance while maintaining the rigidity of the block.

As shown in FIG. 4(a), the grooved block 15 comprises an outer portion 24 in a substantially U-shape in planar view disposed outward of the block groove 20, and an inner portion 23 is a substantially rectangle shape surrounded by the block groove 20.

An area S1 of the ground contact surface 23s of the inner portion 23 is preferably not less than 0.15 times, more preferably not less than 0.25 times, and preferably not more than 0.45 times, and more preferably not more than 0.35 times the area Sb of a virtual ground contact surface obtained by filling all grooves formed on the grooved block. The inner portion 23 exhibits the excellent road corresponding performance while suppressing the block chipping.

An area S2 of the ground contact surface 24s of the outer portion 24 is preferably not less than 0.55 times, more preferably not less than 0.60 times, and preferably not more than 0.75, more preferably not more than 0.70 times the area Sb of the virtual ground contact surface. This outer portion 24 effectively maintains the rigidity of the block and improves the feeling of grounding and grip feeling.

As shown in FIG. 4(b), the difference t1 (not shown) in height of ground contact surface between the outer portion 24 and the inner portion 23 is preferably not more than 2.0 mm, more preferably not more than 1.0 mm. In this embodiment, the ground contact surface 24s of the outer portion 24 and the ground contact surface 23s of the inner portion 23 are smoothly continuous with each other via the block groove 20. Accordingly, the ground contact pressure acts evenly on the outer portion 24 and the inner portion 23, therefore uneven wear of the block is effectively suppressed.

Figure 5:
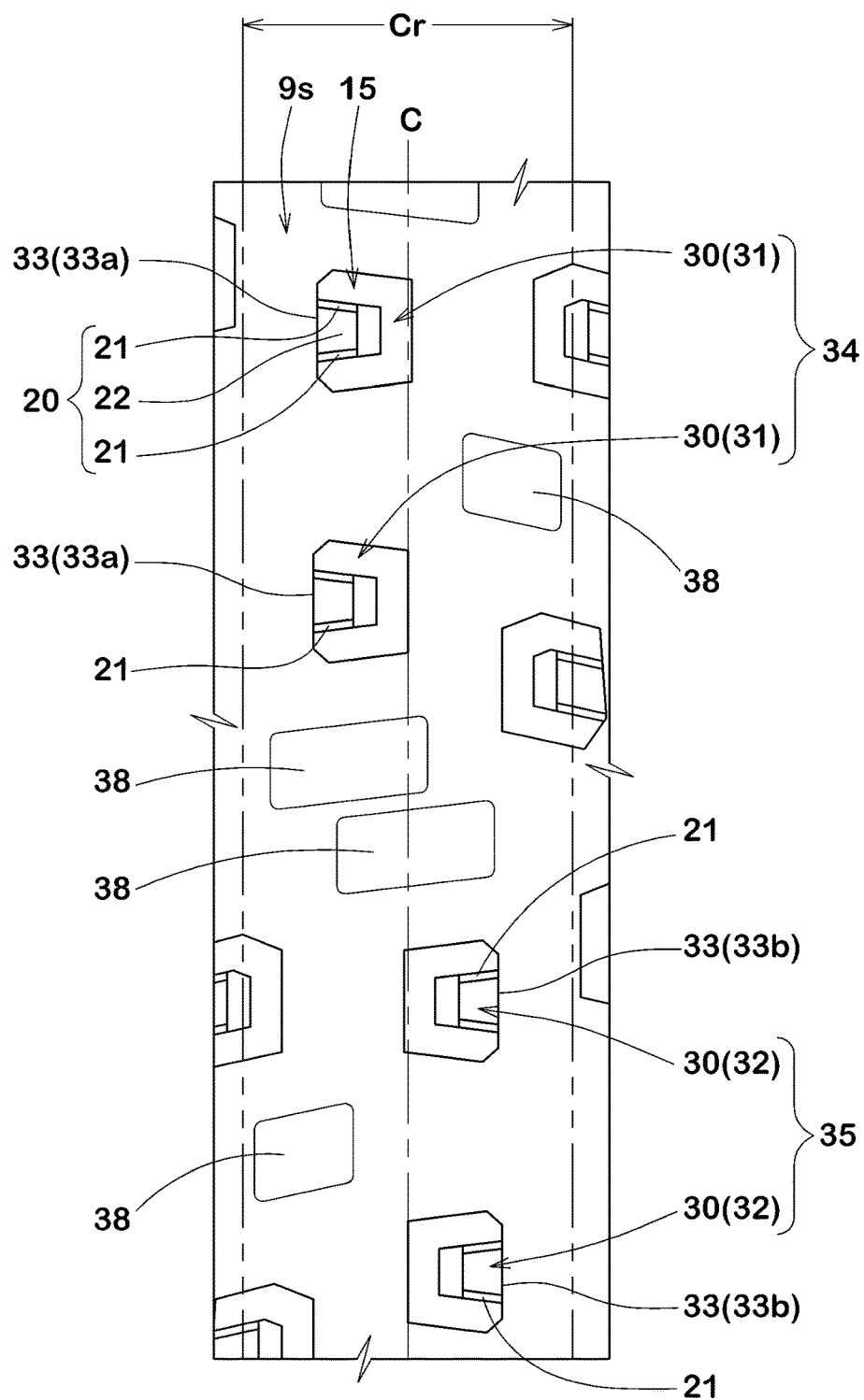
FIG. 5 is an enlarged exploded view of a crown region.

FIG. 5 is an enlarged developed view of the crown region Cr. As shown in FIG. 5, the grooved block 15 includes a grooved crown block 30 provided in the crown region Cr. Incidentally, if the block is across the boundary of each region, the region where the center of gravity of the ground contact surface of the block is located is the region where the block is provided.

The first groove portion 21 of the grooved crown block 30 is preferably communicated with the edge 33 of the ground contact surface on the side of a tread edge Te. In this grooved crown block 30, the inner portion 23 is bent toward the second groove portion 22 with the increase of the bar angle. Therefore, the mud in the second groove portion 22 can be effectively discharged.

The grooved crown block 30 is desirably provided on the tire equator C. As a result, a large ground contact pressure acts on the grooved crown block 30. For this reason, the grooved crown block 30 effectively grasps the road surface thereby obtaining excellent grip feeling.

The grooved crown block 30 includes a first grooved crown block 31 and a second grooved crown block 32. In the first grooved crown block 31, the first groove portion 21 is communicated with a first tread end side edge 33a. In the second grooved crown block 32, the first groove portion 21 is communicated with a second tread edge side edge 33b.

A plurality of the first grooved crown blocks 31 are continuously arranged in the circumferential direction of the tire. Thus, a first grooved crown block group 34 is formed. A plurality of the second grooved crown blocks 32 are continuously arranged in the circumferential direction of the tire. Thus, a second grooved crown block group 35 is formed. The first grooved crown block group 34 and the second grooved crown block group 35 of the present embodiment comprises two blocks, respectively.

The first grooved crown block group 34 and the second grooved crown block group 35 are desirably disposed alternately in the circumferential direction of the tire. These first grooved crown block group 34 and second grooved crown block group 35 improve the straight-line stability.

In the crown region Cr, it is desirable to provide a recess 38 where a groove bottom surface 9s is recessed. This recess 38 is to prevent the mud from adhering to the groove bottom surface 9s and exhibits the excellent road corresponding performance.

The recess 38 may, for example, be preferably provided between the first grooved crown block group 34 and the second grooved crown block group 35. This recess 38 effectively inhibits the adhesion of the mud in the vicinity of the tire equator C where the mud is easily compacted.

Figure 6:
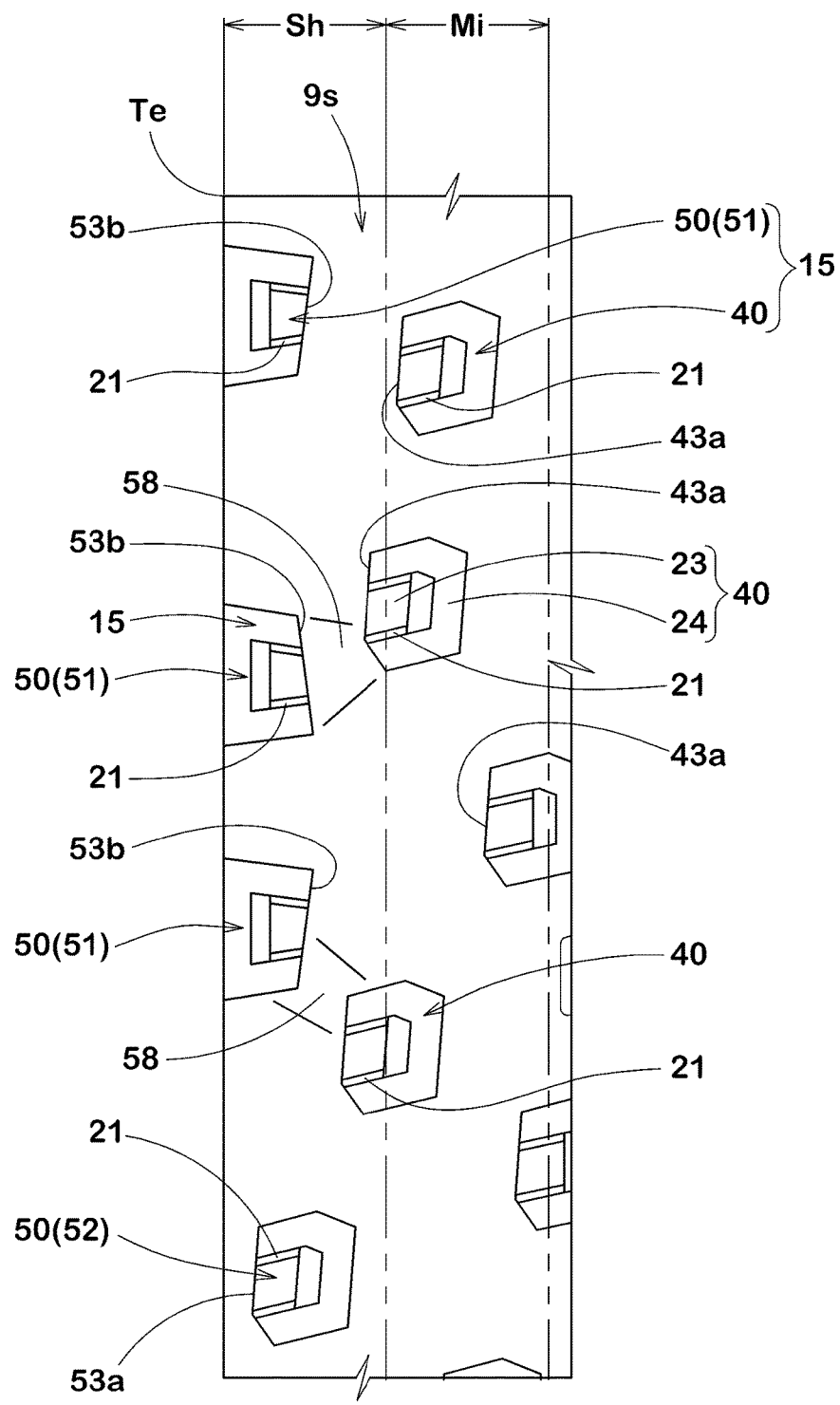
FIG. 6 is an enlarged exploded view of a middle region and a shoulder region.

FIG. 6 is an enlarged view of the middle region Mi and the shoulder region Sh. As shown in FIG. 6, the grooved block 15 includes a grooved middle block 40 disposed in the middle region Mi and a grooved shoulder block 50 disposed in the shoulder region Sh.

The grooved middle block 40 of the first groove portion 21 preferably communicates with an edge 43a of the ground contact surface of the block on the side of the tread edge Te. In this grooved middle block 40, the mud in the second groove portion 22 is effectively discharged and exhibits the excellent road surface corresponding performance.

Respective grooved middle blocks 40 provided plurally in the circumferential direction of the tire preferably misaligned from each other in the axial direction of the tire. These grooved middle blocks 40 maintain the grip feeling to a constant when the camber angle is increased and exhibit excellent steering stability.

The grooved shoulder block 50 includes a first grooved shoulder blocks 51 disposed in axially outermost in the shoulder region Sh, and a second grooved shoulder block 52 disposed more axially inside than the first grooved shoulder block 51.

The first groove portion 21 of the first grooved shoulder block 51 is communicated with the edge 53b of the ground contact surface on the side of the tire equator C. The first groove portion 21 of the second grooved shoulder block 52 is communicated with the edge 53a of the ground contact surface of the block on the side of the tread edge Te. These first grooved shoulder block 51 and second grooved shoulder block 52 exert the excellent ground feeling at the time of a full bank, moreover, they effectively discharge the mud of the block groove thereby improving the road surface corresponding performance.

Between the first grooved shoulder block 51 and the grooved middle block 40, it is desirable to provide a tie bar 58 formed by upraising the groove bottom surface 9s. This tie bar 58 increases the rigidity between the first grooved shoulder block 51 and the grooved middle block 40, thereby improving the steering stability during the full bank.

Having described in detail a pneumatic tire of the present invention, the present invention is not limited to the specific embodiments described above may be performed by changing to various aspects.

EXAMPLE

A test pneumatic tire for a motorcycle for rough terrain having a basic structure shown in FIG. 1 and a basic pattern shown in the tread pattern in FIG. 2 was prototypically manufactured. As Comparative Example 1, a test tire comprising a block without block groove was manufactured. As Comparative Example 2, a test tire having same groove width and groove depth from each other in a first groove portion and a second groove portion of the block groove. These test tires were mounted on a front wheel of a test vehicle to test performances. Common specifications and test methods for each test ti re were as follows:

Vehicle used: exhaust amount 450 cc motorcycle
Tire size: 80/100-21
Rim size: 1.60×21
Internal pressure: 80 kPa <Ground Contact Feeling, Grip Feeling, Steering Stability, Rigidity Feeling, and Road Surface Corresponding Performance>

Under the above conditions, "ground contact feeling", "grip feeling", "steering stability", "rigid feeling" and "road corresponding performance" at the time of traveling on a test course of uneven ground, in which a dry road surface and a wet road surface were mixed, were evaluated by a sensory driver. The result is a score for the 100 value of Comparative Example 1. The higher numerical value, the better the performances.

<Presence or Absence of Mud Clogging>

The presence or absence of the mud clogging of the block groove after traveling on the above-mentioned test course under the above-mentioned conditions were evaluated as follows by visual observation.

A: No mud clogging, the better.
B: Mud clogging has occurred, moreover, the mud has been compacted in the block groove.

The results of the test are shown in Table 1.

TABLE 1

|  | Com. Ex. 1 | Com. Ex. 2 | E. 1 | Ex. 2 | Ex. 3 | Ex. 4 | Ex. 5 | Ex. 6 | Ex. 7 |
| --- | --- | --- | --- | --- | --- | --- | --- | --- | --- |
| Presence/absence of grooved clown block | — | Presence | Presence | Presence | Absence | Absence | Absence | Presence | Presence |
| Presence/absence of grooved middle block | — | Presence | Presence | Absence | Presence | Absence | Presence | Presence | Absence |
| Presence/absence of grooved shoulder block | — | Presence | Presence | Absence | Absence | Presence | Presence | Absence | Presence |
| Position of first groove portion of grooved middle block (*) | — | Te | Te | — | Te | — | Te | Te | — |
| Position of first groove portion of grooved shoulder block (*) | — | C | C | — | — | C | C | — | C |
| Difference t1 in height of ground contact surface between outer portion and inner portion (mm) | — | 0.0 | 0.0 | 0.0 | 0.0 | 0.0 | 0.0 | 0.0 | 0.0 |
| Groove width W1 of first groove portion (mm) | — | 1.0 | 1.0 | 1.0 | 1.0 | 1.0 | 1.0 | 1.0 | 1.0 |

TABLE 1-continued

|  |  |  |  |  |  |  |  |  |
|---|---|---|---|---|---|---|---|---|
| Groove depth d1 of first groove portion (mm) | — | 1.0 | 1.0 | 1.0 | 1.0 | 1.0 | 1.0 | 1.0 | 1.0 |
| Groove width W2 of second groove portion (mm) | — | 1.0 | 2.5 | 2.5 | 2.5 | 2.5 | 2.5 | 2.5 | 2.5 |
| Groove depth d2 of second groove portion (mm) | — | 1.0 | 2.0 | 2.0 | 2.0 | 2.0 | 2.0 | 2.0 | 2.0 |
| Area S1 of inner portion/area Sb of virtual ground contact surface | — | 0.2 | 0.2 | 0.2 | 0.2 | 0.2 | 0.2 | 0.2 | 0.2 |
| Ground contact feeling (mark) | 100 | 103 | 105 | 101 | 103 | 102 | 104 | 103 | 103 |
| Grip feeling (mark) | 100 | 102 | 104 | 101 | 102 | 101 | 103 | 102 | 102 |
| Steering stability mark) | 100 | 102 | 105 | 100 | 102 | 102 | 103 | 102 | 102 |
| Rigidity feeling (mark) | 100 | 106 | 105 | 100 | 102 | 101 | 103 | 102 | 102 |
| Road surface corresponding performance (mark) | 100 | 95 | 106 | 103 | 104 | 104 | 105 | 104 | 103 |
| Presence/absence of mud clogging | — | B | A | A | A | A | A | A | A |

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| Presence/absence of grooved clown block | Presence Presence | Presence Presence | Presence Presence | Presence Presence | Presence Presence | Presence Presence | Presence Presence | Presence Presence |
| Presence/absence of grooved middle block | Presence | Presence | Presence | Presence | Presence | Presence | Presence | Presence |
| Presence/absence of grooved shoulder block | Te | Te | Te | Te | Te | Te | C | Te |
| Position of first groove portion of grooved middle block (*) | C | C | C | C | C | C | C | Te |
| Position of first groove portion of grooved shoulder block (*) | 2.00 | −2.00 | 0.00 | 0.00 | 0.00 | 0.00 | 0.00 | 0.00 |
| Difference t1 in height of ground contact surface between outer portion and inner portion (mm) | 1.00 | 1.00 | 2.50 | 0.50 | 1.00 | 1.00 | 1.00 | 1.00 |
| Groove width W1 of first groove portion (mm) | 1.00 | 1.00 | 2.50 | 0.40 | 1.00 | 1.00 | 1.00 | 1.00 |
| Groove depth d1 of first groove portion (mm) | 2.50 | 2.50 | 5.50 | 1.00 | 2.50 | 2.50 | 2.50 | 2.50 |
| Groove width W2 of second groove portion (mm) | 2.00 | 2.00 | 4.50 | 2.00 | 2.00 | 2.00 | 2.00 | 2.00 |
| Groove depth d2 of second groove portion (mm) | 0.20 | 0.20 | 0.20 | 0.20 | 0.45 | 0.15 | 0.20 | 0.20 |
| Area S1 of inner portion/area Sb of virtual ground contact surface | 103 | 102 | 101 | 100 | 102 | 101 | 102 | 101 |
| Ground contact feeling (mark) | 103 | 102 | 101 | 101 | 102 | 101 | 99 | 101 |
| Grip feeling (mark) | 102 | 101 | 100 | 100 | 102 | 100 | 100 | 99 |
| Steering stability mark) | 99 | 101 | 100 | 100 | 102 | 100 | 102 | 102 |
| Rigidity feeling (mark) | 104 | 101 | 102 | 101 | 101 | 102 | 101 | 102 |
| Road surface corresponding performance (mark) | A | A | A | A | A | A | A | A |

(*) "C" means that the first groove portion is communicated with an edge on a side of the tire equator; and "Te" means that the first groove portion is communicated with an edge on a side of a tread edge.

Result of the test, it was confirmed that the tires of Examples suppressed the mud clogging into the block groove, and the ground feeling and performance such as grip feeling were maintained.

DESCRIPTION OF THE CODE

2 Tread portion
10 Block
15 Grooved block
20 Block groove
21 First groove portion
22 Second groove portion

The invention claimed is:

1. A motorcycle tire for rough terrain comprising:
a tread portion comprising a block pattern having a plurality of blocks;
the plurality of blocks comprising at least one grooved block whose ground contact surface is provided with a block groove;
the block groove comprising a pair of first groove portions mutually extending in a same direction from an edge of the ground contact surface, and a second groove portion connecting the pair of first groove portions;
the second groove portion having a groove width greater than groove widths of the pair of first groove portions; and
the at least one grooved block comprising first grooved crown blocks arranged successively in a tire circumferential direction to form a first grooved crown block group and second grooved crown blocks arranged successively in the tire circumferential direction to form a second grooved crown block group, wherein:
each of the first and second grooved crown blocks comprises an axially first side edge and an axially second side edge opposite to the first side edge, each of the first grooved crown blocks is provided with the pair of first groove portions communicating with the axially first side edge without communicating with the axially second side edge, and each of the second grooved crown blocks is provided with the pair of first groove portions communicating with the axially second side edge without communicating with the axially first side edge.

2. The motorcycle tire for rough terrain according to claim 1, wherein each of the first and second grooved crown blocks comprises an outer portion in a substantially U-shape in planar view disposed outward of the block groove, and an inner portion surrounded by the block groove, and the ground contact surface of the outer portion and the ground contact surface of the inner portion are smoothly continuous with each other through the block groove.

3. The motorcycle tire for rough terrain according to claim 1, wherein each of the first and second grooved crown blocks comprises the outer portion in a substantially U-shape in planar view disposed outward of the block groove, and the inner portion surrounded by the block groove, and the area S1 of the ground contact surface of the inner portion is from 0.15 to 0.45 times the area Sb of a virtual ground contact surface obtained upon being filled up all grooves formed on the concerned grooved block.

4. The motorcycle tire for rough terrain according to claim 1, wherein the pair of first groove portions extend in an axial direction of the tire.

5. The motorcycle tire for rough terrain according to claim 1, wherein the tread portion comprises, in a meridian section including the tire rotational axis, a crown region occupying ⅓ of a tread developed width centered at a tire equator, a pair of shoulder regions each occupying ⅙ of the tread developed width, and middle regions each disposed between the crown region and the shoulder region, each of the first and second grooved crown blocks is disposed in the crown region, the at least one grooved block comprises a grooved middle block disposed in the middle region, and the pair of first groove portions of the grooved middle block are communicated with an edge of the ground contact surface on a side of a tread edge.

6. The motorcycle tire for rough terrain according to claim 5, wherein the at least one grooved block comprises a first grooved shoulder block disposed in axially outermost in the shoulder region, and the pair of first groove portions of the first grooved shoulder block are communicated with an edge of the ground contact surface on a side of the tire equator.

7. The motorcycle tire for rough terrain according to claim 1, wherein the first grooved crown block group and the second grooved crown block group are arranged alternately in the tire circumferential direction.

8. A motorcycle tire for rough terrain comprising:

a tread portion comprising a block pattern having a plurality of blocks;

the plurality of blocks comprising at least one grooved block whose ground contact surface is provided with a block groove;

the block groove comprising a pair of first groove portions mutually extending in a same direction from an edge of the ground contact surface, and the second groove portion connecting the pair of first groove portions; and the second groove portion having a groove depth greater than groove depths of the pair of first groove portions; and the at least one grooved block comprising first grooved crown blocks arranged successively in a tire circumferential direction to form a first grooved crown block group and second grooved crown blocks arranged successively in the tire circumferential direction to form a second grooved crown block group, wherein:

each of the first and second grooved crown blocks comprises an axially first side edge and an axially second side edge opposite to the first side edge, each of the first grooved crown blocks is provided with the pair of first groove portions communicating with the axially first side edge without communicating with the axially second side edge, and each of the second grooved crown blocks is provided with the pair of first groove portions communicating with the axially second side edge without communicating with the axially first side edge.

9. The motorcycle tire for rough terrain according to claim 8, wherein the first grooved crown block group and the second grooved crown block group are arranged alternately in the tire circumferential direction.

* * * * *